United States Patent Office 2,873,010
Patented Feb. 10, 1959

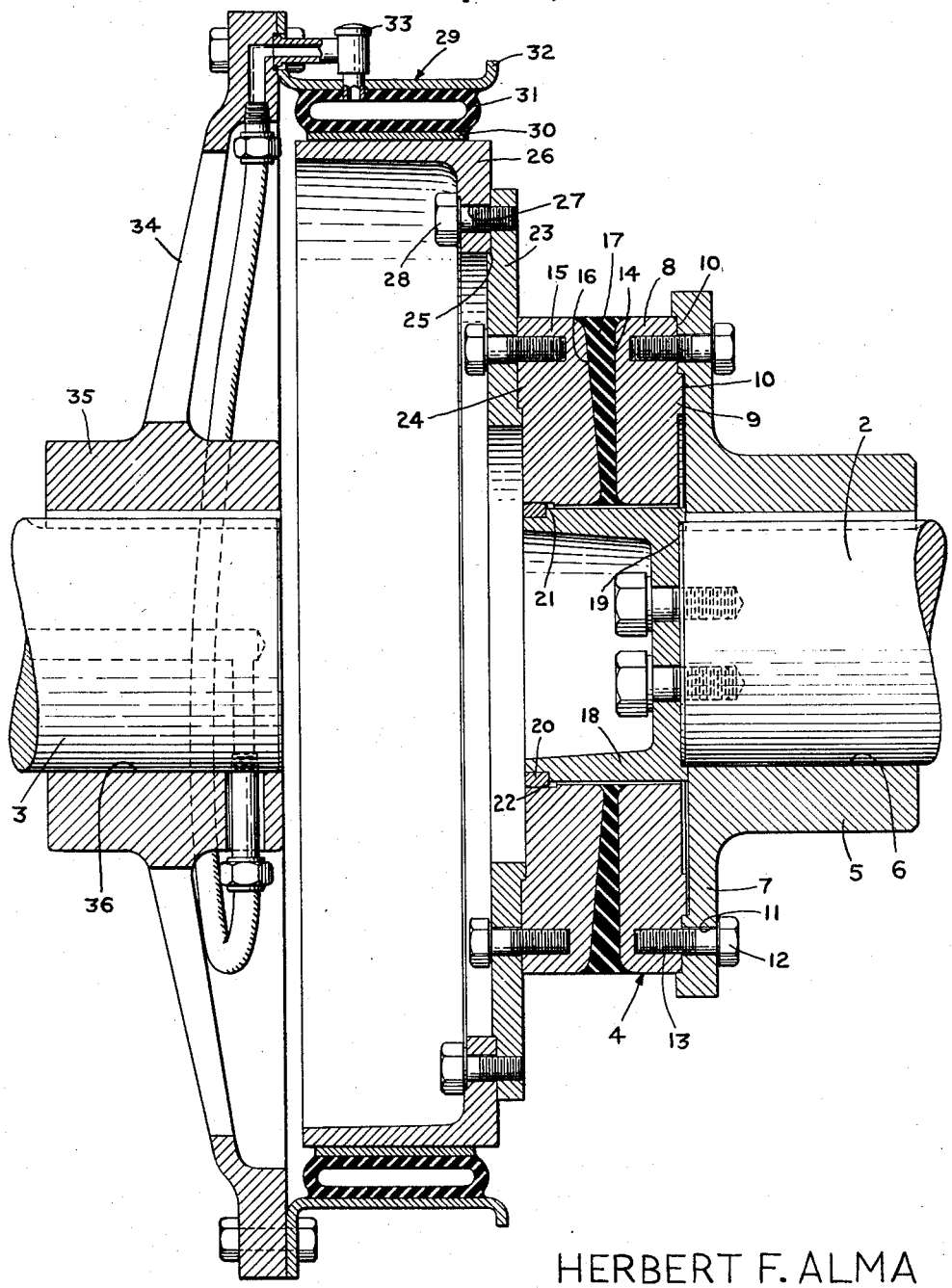
HERBERT F. ALMA
*INVENTOR.*

2,873,010

FLEXIBLE COUPLING

Herbert F. Alma, East Aurora, N. Y., assignor to Worthington Corporation, Harrison, N. J., a corporation of Delaware Application April 20, 1954, Serial No. 424,358

1 Claim. (Cl. 192—88)

This invention relates generally to a power transmission coupling, and more particularly, to a flexible coupling adapted to transmit power between two rotary members, such as a drive shaft and a driven shaft, in which the coupling is designed to overcome end thrust created by the flexible power transmission element therein under torque.

In my co-pending applications, Serial No. 349,127, filed on April 16, 1953, and Serial No. 424,359, filed on April 10, 1954, now both abandoned, several forms of flexible couplings for transmitting power which overcome the effect of end thrust and its concomitant difficulties were illustrated and described.

The present invention shows another form of flexible coupling to overcome this difficulty by combining a half coupling formed of a metal-rubber-metal sandwich element and a friction clutch with a flexible means which allows relative axial movement in the coupling itself without restricting the relative misalignment which may occur between the rotary members and thus overcome the effect of end thrust on the connected rotary member.

With these and other objects in view, as may appear from the accompanying specification, the invention consists of various features of construction and combination of parts, which will be first described in connection with the accompanying drawing, showing a flexible coupling of a preferred form embodying the invention, and the features forming the invention will be specifically pointed out in the claim.

The flexible coupling is shown in the drawing mounted on the adjacent ends of the rotary shafts 2 and 3. It includes a rubber sandwich type coupling 4 mounted on the shaft 2 by means of a hub 5 having a bore 6 which fits around the shaft and is keyed thereon to prevent relative motion between the hub and the shaft in the manner well known in the art. The hub 5 is provided with an annular flange on its outer circumference to connect the rubber sandwich structure thereto as hereinafter described.

The rubber sandwich structure 4 consists of two annular metal elements bonded to an annular rubber element.

The outer face of the first or inner metal element 8 is provided with an annular lateral projection 9 to receive the double counterbore 10 on the aforementioned flange of the hub preventing radial movement of the rubber sandwich member but allowing axial movement of the metal member 8 when the rubber sandwich member is placed in operation and torque is developed. Circumferentially spaced axially disposed openings 11 are provided in the flange through which bolts 12 extend to engage similarly aligned threaded bores 13 in the inner metal member thereby connecting the members. The inner side 14 of the first metal element is substantially perpendicular to the axis of the shaft except for the edges which are rounded.

The second metal element 15 is tapered on the inner face 16 so that the cross section is of lesser width at the outside diameter than the inside diameter. The edges are also rounded.

The rubber element 17 conforms to the shape of the inner surfaces 14 and 16 of these elements as is clearly shown in the drawing. The bonding of the metal elements to the rubber element is known in the art and since it does not form part of the invention is not described herein.

A support element 18 is fitted within the inner circumference of the rubber sandwich structure to support the said structure and prevent radial collapse and misalignment of the said structure. It is provided with a counterbore 19 to engage the rotary member and is bolted thereto by threaded means.

A support ring 20 is placed between the rubber sandwich 4 and the first support element 18 as shown in the drawing. A groove about the outer circumference of the first support element and the inner circumference of the rubber sandwich structure accommodates the said ring. The purpose of the support ring is to prevent radial movement of the sandwich, however, the outer surface 22 is rounded to allow slight misalignment of the sandwich structure relative to the shaft.

A spacer element 23 is connected to the second annular metal element by threaded means, said metal element being provided with a counterbore 24 to engage the spacer. The opposite side of the spacer has a shoulder 25 thereon which receives the inner circumference of the friction drum 26, and has bores 27 therein for connecting it to the said drum by bolts 28.

The friction drum 26 is a part of the Fawick Airflex clutch generally designated 29 purchasable on the open market and is more fully described hereinafter.

The Fawick Airflex clutch consists of a plurality of friction shoes 30 assembled in a ring around the friction drum. A tube 31 of cord and rubber within the housing 32 encircles the friction shoes. The clutch is actuated by air under pressure through the air connection 33, providing 360° radial contact between the friction shoes and the drum. Automatic pressure balancing of air in the tube offsets the effect of misalignment.

In the operation of this flexible coupling the effect of the torque on the rubber sandwich structure will tend to shorten it in the axial direction. The axial movement caused by the end thrust is absorbed by the flexible walls of the cord and rubber tube in the clutch.

The clutch housing is attached to the spider flange 34 of the adapter hub 35 by threaded means and the hub having a bore 36 is fitted about the shaft 3 and keyed thereto to prevent movement of the hub relative to the shaft.

It will be understood that the invention is not to be limited to the specific construction or arrangement of parts shown, but that they may be widely modified within the invention defined by the claim.

What is claimed is:

A flexible coupling disposed between adjacent ends of rotary elements comprising the combination of, a friction clutch having a friction drum, and ring means including flexible means disposed radially thereabout and adapted to permit radial movement of the drum, with a rubber sandwich coupling including annular rings and a rubber portion bonded between the respective faces of said annular rings, the face of one of said rings being substantially perpendicular to the axis of the rotary elements and the face of the other ring being tapered, the opposite face of at least one of said annular rings including an annular lateral projection, means coacting with said annular projection for rigidly connecting the rubber sandwich coupling between the rotary elements, and said means for coacting with said annular projection and for rigidly connecting the rubber sandwich coupling between the rotary elements comprising a hub means connected to one of said rotary elements, said hub including a flange for connection to and coaction with the annular ring having the annular lateral projection, a spacer ring, a support element in said rubber sandwich and connected at one end to the rotary element having the hub mounted thereon and at the other end abutting said spacer ring, said spacer ring abutting and supporting the other annular ring whereby said spacer ring maintains the rubber sandwich concentric with the last mentioned rotary element during the operation thereof, and a spacer element for rigidly connecting the rubber sandwich coupling to the friction drum.

References Cited in the file of this patent

UNITED STATES PATENTS

| | | |
|---|---|---|
| 1,649,426 | Van Ranst | Nov. 15, 1927 |
| 1,790,516 | Williams | Jan. 27, 1931 |
| 2,003,322 | Vail | June 4, 1935 |
| 2,114,570 | Renaud | Apr. 19, 1938 |
| 2,237,864 | Fawick | Apr. 8, 1941 |
| 2,338,476 | Wittkop | Jan. 4, 1944 |
| 2,386,478 | Kraft | Oct. 9, 1945 |
| 2,556,624 | Macbeth et al. | June 12, 1951 |
| 2,742,769 | Gleeson | Apr. 24, 1956 |

FOREIGN PATENTS

| | | |
|---|---|---|
| 554,761 | Great Britain | July 19, 1943 |